June 21, 1938.  V. GERACI  2,121,467
RINGLET SETTING IMPLEMENT
Filed April 28, 1937
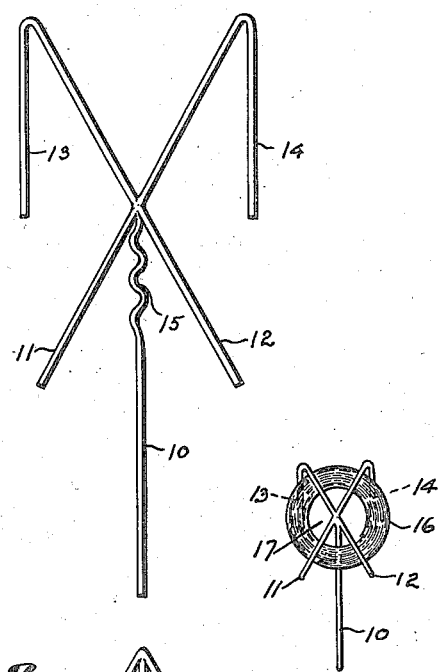
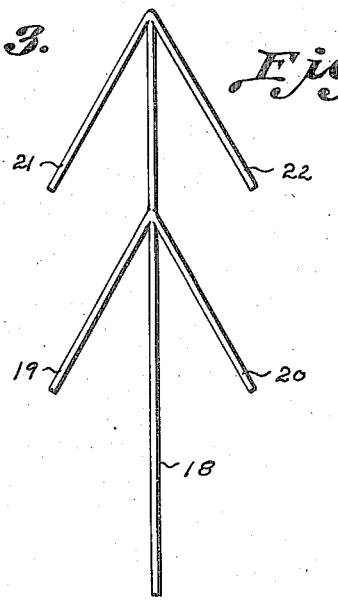
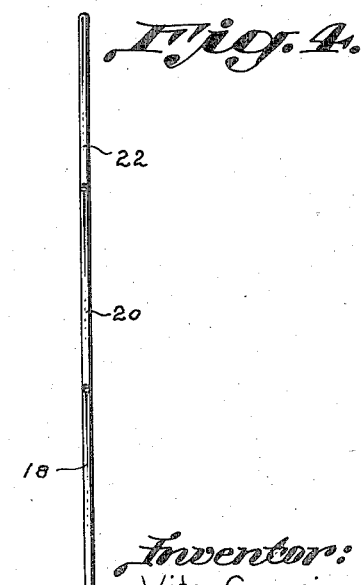
Inventor:
Vito Geraci
Attorney.

Patented June 21, 1938

2,121,467

UNITED STATES PATENT OFFICE 2,121,467

RINGLET SETTING IMPLEMENT

Vito Geraci, Brooklyn, N. Y., assignor of one-half to Alfonso Furibondo, Brooklyn, N. Y.

Application April 28, 1937, Serial No. 139,450

3 Claims. (Cl. 132—1)

The invention relates to an implement used for holding artificial ringlets, formed in women's hair, in shape while these are drying or setting. It has for its main object to provide an implement which will effectively hold a ringlet in its proper shape while setting. Another object is to so construct the implement that it is easy to manipulate both in insertion and in removal.

A further object is to so construct the implement that it can readily be cleaned or sterilized so that it may be used over and over again. Additional objects are to provide an implement of simple construction, which will not inconvenience the person in whose hair it is used, and which can be manufactured and sold at a low cost.

These and various other objects and advantages will be readily understood from the following description and from the accompanying drawing of preferred embodiments of the invention, in which, however, various modifications might be made without departing from the scope of the appended claims. In the drawing—

Fig. 1 is an enlarged plan view of the implement,

Fig. 2 is a side view of Fig. 1,

Fig. 3 is an enlarged plan view of a somewhat modified implement,

Fig. 4 is a side view of Fig. 3, and

Fig. 5 is a view showing the manner in which the implement is used for holding a ringlet.

Referring now to Figs. 1, 2 and 5, the implement, which is preferably made of flexible wire, consists of a main prong 10 and four other prongs 11, 12, 13 and 14, arranged as plainly shown in Fig. 1. The main prong is preferably corrugated as shown at 15. In using this implement or holder on a ringlet 16, which has been treated with the customary dressing and formed into the desired shape, the main prong 10 is inserted through the center 17 of the ringlet and in underneath a portion of the hair of the person whose hair is being treated. In pushing in the implement the prongs 11 and 12 are placed on top of the hair of the ringlet so that a part of the ringlet will be held between the prongs 11 and 12 and the main prong 10. The other two prongs 13 and 14 are pushed underneath the ringlet so that the whole ringlet will be completely held in shape by the various prongs. This is plainly illustrated in Fig. 5. After the ringlet is dry, the implement is removed and can, after being cleaned, be used again.

Fig. 3 is a slightly modified implement which is employed in the same manner as the one just described. In this instance the main prong is shown at 18 and the four other prongs are shown at 19, 20, 21 and 22. The wire from which the implements are made may be either round or flat and it is evident that the prongs might be formed in other shapes, than those shown, as long as they are so located that they will clamp the ringlet in the manner described.

It will be seen that with this implement it is possible to hold a great many ringlets in place while they are drying, and that the construction of the implement is such that it does not inconvenience the person being treated.

Having described the invention and its objects, what I claim as new and wish to protect by Letters Patent is:—

1. A ringlet setting implement comprising a single, central main prong; a pair of oppositely-disposed prongs formed at one end of the main prong and extending substantially towards its other end; another set of oppositely-disposed prongs likewise formed on the main prong some distance from the prongs on the end and extending substantially in the same direction as these prongs; one set of prongs adapted to be inserted under the ringlet, after it has been previously treated and shaped; the other set of prongs adapted to be placed on the top of the ringlet; the main prong adapted to be inserted in the hair of the person being treated to hold the whole implement in place; and all the prongs positioned in the same plane.

2. A ringlet setting implement comprising a single, central main prong; a pair of oppositely-disposed prongs formed at one end of the main stem and extending towards its other end with their extreme ends parallel with the main prong; another set of oppositely-disposed prongs likewise formed on the main stem, and extending angularly from the main prong towards its other end; one set of prongs adapted to be inserted under the ringlet, after it has been previously treated and shaped; the other set of prongs adapted to be placed on the top of the ringlet; the main prong adapted to be inserted in the hair of the person being treated to hold the whole implement in place; and all the prongs positioned in the same plane.

3. A ringlet setting implement comprising a single, central main prong; a pair of oppositely-disposed prongs formed at one end of the main prong and extending angularly towards its other end, another set of oppositely-disposed prongs likewise formed on the main prong, some distance from the prong on the end, and extending parallel with these prongs; one set of prongs adapted to be inserted under the ringlet, after it has been previously treated and shaped; the other set of prongs adapted to be placed on the top of the ringlet; the main prong adapted to be inserted in the hair of the person being treated to hold the whole implement in place; and all the prongs positioned in the same plane.

VITO GERACI.